US012490654B2

(12) United States Patent
Hill

(10) Patent No.: US 12,490,654 B2
(45) Date of Patent: Dec. 2, 2025

(54) HIGH TEMPERATURE OXIDE-BASED SYSTEM FOR THERMOELECTRIC SENSOR APPLICATIONS

(71) Applicant: Skyworks Solutions, Inc., Irvine, CA (US)

(72) Inventor: Michael David Hill, Frederick, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 934 days.

(21) Appl. No.: 17/038,736

(22) Filed: Sep. 30, 2020

(65) Prior Publication Data

US 2021/0098675 A1    Apr. 1, 2021

Related U.S. Application Data

(60) Provisional application No. 62/908,058, filed on Sep. 30, 2019.

(51) Int. Cl.
H10N 10/855    (2023.01)
C01F 17/34    (2020.01)
C01G 45/1264    (2025.01)
C01G 51/68    (2025.01)
G01K 7/01    (2006.01)
H10N 10/01    (2023.01)

(52) U.S. Cl.
CPC ........... *H10N 10/855* (2023.02); *C01F 17/34* (2020.01); *C01G 45/1264* (2013.01); *C01G 51/68* (2013.01); *G01K 7/01* (2013.01); *H10N 10/01* (2023.02); *C01P 2002/34* (2013.01); *C01P 2002/52* (2013.01); *C01P 2006/40* (2013.01)

(58) Field of Classification Search
None
See application file for complete search history.

(56) References Cited

U.S. PATENT DOCUMENTS

| | | |
|---|---|---|
| 7,572,748 B1 | 8/2009 | Hill et al. |
| 7,633,424 B1 | 12/2009 | Hill |
| 7,875,567 B2 | 1/2011 | Hill et al. |
| 8,835,339 B2 | 9/2014 | Hill |
| 8,945,729 B1 | 2/2015 | Hill |
| 9,328,029 B2 | 5/2016 | Hill |
| 9,505,632 B2 | 11/2016 | Hill et al. |
| 10,308,522 B2 | 6/2019 | Hill |
| 10,315,959 B2 | 6/2019 | Hill |
| 10,483,619 B2 | 11/2019 | Hill et al. |
| 10,513,463 B2 | 12/2019 | Hill et al. |
| 2006/0118160 A1* | 6/2006 | Funahashi ............ H10N 10/817 136/211 |
| 2009/0186753 A1 | 7/2009 | Hill et al. |
| 2009/0264275 A1 | 10/2009 | Hill et al. |
| 2010/0068112 A1 | 3/2010 | Hill |

(Continued)

Primary Examiner — Tamir Ayad
(74) Attorney, Agent, or Firm — Knobbe, Martens, Olson & Bear, LLP

(57) ABSTRACT

Disclosed herein are embodiments of n and p-type components with high temperature refractory material having a perovskite crystal structure. The material may be doped to generate, for example, p-type and n-type sensor legs. In some embodiments, expensive materials may be avoided. Further, the disclosed materials can avoid high temperature reaction between n-type components and p-type components.

17 Claims, 10 Drawing Sheets

(56) References Cited

U.S. PATENT DOCUMENTS

| | | |
|---|---|---|
| 2010/0248937 A1 | 9/2010 | Hill et al. |
| 2012/0068103 A1 | 3/2012 | Hill et al. |
| 2012/0329635 A1 | 12/2012 | Hill |
| 2014/0225022 A1* | 8/2014 | Backhaus-Ricoult .................... C04B 35/645 252/62.3 T |
| 2014/0346387 A1 | 11/2014 | Hill et al. |
| 2015/0065332 A1 | 3/2015 | Hill |
| 2015/0274981 A1 | 10/2015 | Hill |
| 2016/0300993 A1* | 10/2016 | Samsonidze ............ C22C 28/00 |
| 2017/0098885 A1 | 4/2017 | Hill et al. |
| 2017/0341950 A1 | 11/2017 | Hill |
| 2018/0086672 A1 | 3/2018 | Hill et al. |
| 2018/0086673 A1 | 3/2018 | Hill |
| 2019/0006067 A1 | 1/2019 | Hill |
| 2019/0300378 A1 | 10/2019 | Hill |
| 2019/0315660 A1 | 10/2019 | Hill |
| 2020/0127367 A1 | 4/2020 | Hill et al. |

* cited by examiner

HIGH TEMPERATURE OXIDE-BASED SYSTEM FOR THERMOELECTRIC SENSOR APPLICATIONS

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57.

BACKGROUND

Field

Embodiments of the disclosure generally relate to high temperature oxide based systems, such as for use for thermoelectric sensor applications.

SUMMARY

Disclosed herein are embodiments of a thermoelectric system for high-temperature applications comprising a p-type material formed from $LnAlO_3$ and doped with strontium and cobalt and having a perovskite structure, and an n-type material formed from $LnAlO_3$ doped with manganese and niobium and having a perovskite structure.

In some embodiments, the system does not contain platinum. In some embodiments, the system does not contain indium tin oxide.

In some embodiments, the p-type material is $Ln_{1-x}SrAl_{1-y}Co_yO_{3+/-z}$, x being between 0 and 1, y being between 0 and 1, and z<1. In some embodiments, the n-type material is $LnAl_{1-x-y}Mn_yNb_xO_{3+/-z}$, x being between 0 and 0.2, y being between 0 and 1, and z<1.

In some embodiments, the n-type material and p-type material are generally unreactive at high temperatures of 400-1200° C. In some embodiments, Ln is selected from the group consisting of La, Ce, Pr, Nd, Sm, Gd, Tb, Dy, Ho, Er, Tm, Y, Yb, and Lu.

Also disclosed herein are embodiments of a thermal sensor comprising a p-type sensor leg formed from $LnAlO_3$ doped with strontium and cobalt and having a perovskite structure, an n-type sensor leg formed from $LnAlO_3$ doped with manganese and niobium and having a perovskite structure, and a voltmeter configured to measure a voltage differential between the p-type sensor leg and the n-type sensor leg.

In some embodiments, the sensor does not contain platinum. In some embodiments, the sensor does not contain indium tin oxide.

In some embodiments, the p-type sensor leg includes $Ln_{1-x}SrAl_{1-y}Co_yO_{3+/-z}$, x being between 0 and 1, y being between 0 and 1, and z<1. In some embodiments, the n-type sensor leg includes $LnAl_{1-x-y}Mn_yNb_xO_{3+/-z}$, x being between 0 and 0.2, y being between 0 and 1, and z<1.

In some embodiments, the sensor is configured for high temperature applications of 400-1200° C. without significant sensing degradation. In some embodiments, Ln is selected from the group consisting of La, Ce, Pr, Nd, Sm, Gd, Tb, Dy, Ho, Er, Tm, Y, Yb, and Lu.

Further disclosed herein are embodiments of a method of manufacturing a thermoelectric system, the method comprising solid state reacting oxide precursor materials to form a $LnAlO_3$ p-type material doped with strontium and cobalt and a $LnAlO_3$ n-type material doped with manganese and niobium, spray drying the p-type and n-type materials into p-type and n-type granules, sintering the p-type and n-type granules into p-type and n-type agglomerates, plasma spraying the p-type agglomerates onto a substrate to form a p-type sensor leg having a perovskite crystal structure, and plasma spraying the n-type agglomerations onto the substrate to form an n-type sensor leg having a perovskite crystal structure.

In some embodiments, the method can further include connecting the n-type sensor leg and the p-type sensor leg to a voltmeter. In some embodiments, the system does not contain platinum or indium tin oxide. In some embodiments, the p-type material is $Ln_{1-x}SrAl_{1-y}Co_yO_{3+/-z}$, x being between 0 and 1, y being between 0 and 1, and z<1. In some embodiments, the n-type material is $LnAl_{1-x-y}Mn_yNb_xO_{3+/-z}$, x being between 0 and 0.2, y being between 0 and 1, and z<1. In some embodiments, the n-type and p-type components are generally unreactive at high temperatures of 400-1200° C.

DETAILED DESCRIPTION

Disclosed herein are embodiments of materials and systems which can be used, for example, as thermoelectric sensors and related applications. Specifically, the materials can include oxide-based chemical systems, such as those particularly advantageous in high temperature applications. High temperature applications can include temperatures of 400-1200° C. (or about 400-about 1200° C.) or 600-1200° C. (or about 600-about 1200° C.) or 800-1200° C. (or about 800-about 1200° C.) or 1000-1200° C. (or about 1000-about 1200° C.), though embodiments of the disclosure can be used at temperatures above 1200° C. as well. Thus, embodiments of the disclosure can be applicable for many different high temperature areas, such as gas turbines and conversion of waste heat to electrical energy. Advantageously, embodiments of the disclosure utilize relatively inexpensive materials for the n and p components of the thermoelectric sensor. Further, these materials can include specific dopant compositions, which results in the minimization or elimination of the chemical potential gradient between n and p legs.

Figure 1:
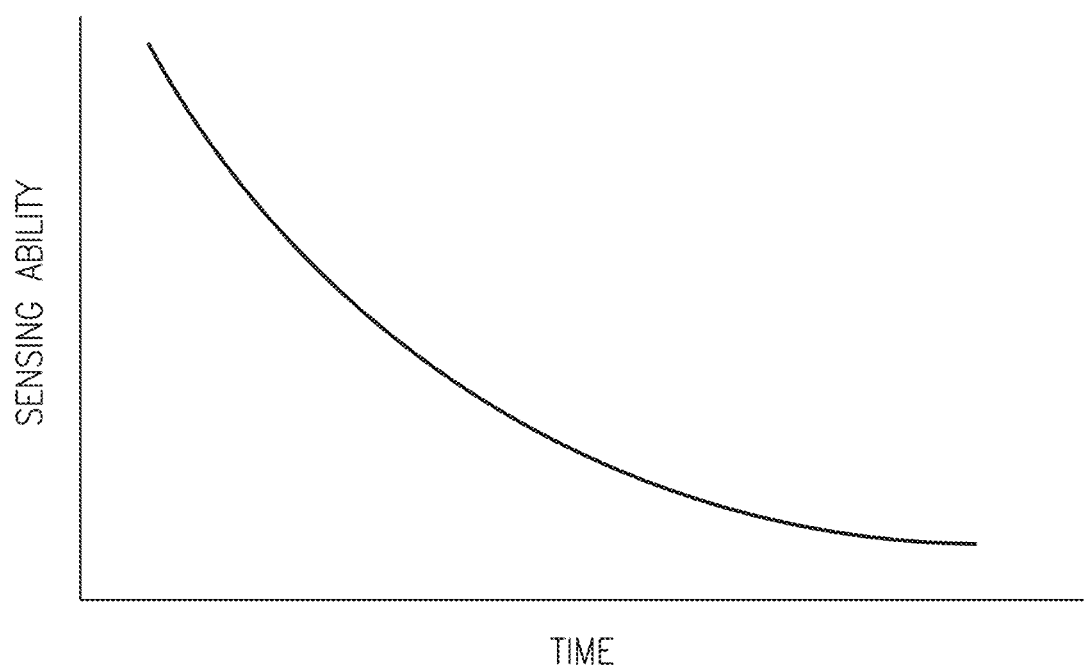
FIG. 1 illustrates sensor decay.

Currently, thermoelectric systems for high-temperature thermal sensing applications involve the use of expensive materials, such as platinum metal or indium tin oxide. Alternatively, high-temperature thermal sensing applications use materials whose ability to sense decays over time due to high temperature reactions, such as between n and p components of a thermoelectric sensor, such as shown in FIG. 1. As time increases towards the right of the graph, the sensing activity can greatly decrease. FIG. 1 illustrates a general trend line, and the sensing activity rates may decrease in a different fashion than shown. Embodiments of the disclosure can maintain a straight, or generally straight, horizontal line at high temperatures where the sensing ability is maintained as time increases. In some embodiments, the sensing ability at 1, 2, 5, 10, 15, 20, 25, 30, 50, or 100 hours of high temperature use, as discussed herein, is within 25%, within 20%, within 15%, within 10%, within 5%, or within 1% of the starting sensing ability.

Thus, the practical lifetime of a sensor is limited by thermocouple aging. The thermoelectric coefficients of the wires in a thermocouple that is used to measure very high temperatures may change with time, and the measurement voltage accordingly drops. The simple relationship between the temperature difference of the junctions and the measurement voltage is only correct if each wire is homogeneous (uniform in composition). As thermocouples age in a process, their conductors can lose homogeneity due to chemical and metallurgical changes caused by extreme or prolonged exposure to high temperatures. If the aged section of the thermocouple circuit is exposed to a temperature gradient, the measured voltage will differ, resulting in error.

Aged thermocouples are only partly modified, for example, being unaffected in the parts outside the furnace (or other heated area). For this reason, aged thermocouples cannot be taken out of their installed location and recalibrated in a bath or test furnace to determine error. This also explains why error can sometimes be observed when an aged thermocouple is pulled partly out of a furnace (or other heated area)—as the sensor is pulled back, aged sections may see exposure to increased temperature gradients from hot to cold as the aged section now passes through the cooler refractory area, contributing significant error to the measurement. Likewise, an aged thermocouple that is pushed deeper into the furnace (or other heated area) might sometimes provide a more accurate reading if being pushed further into the furnace (or other heated area) causes the temperature gradient to occur only in a fresh section.

Figure 2:
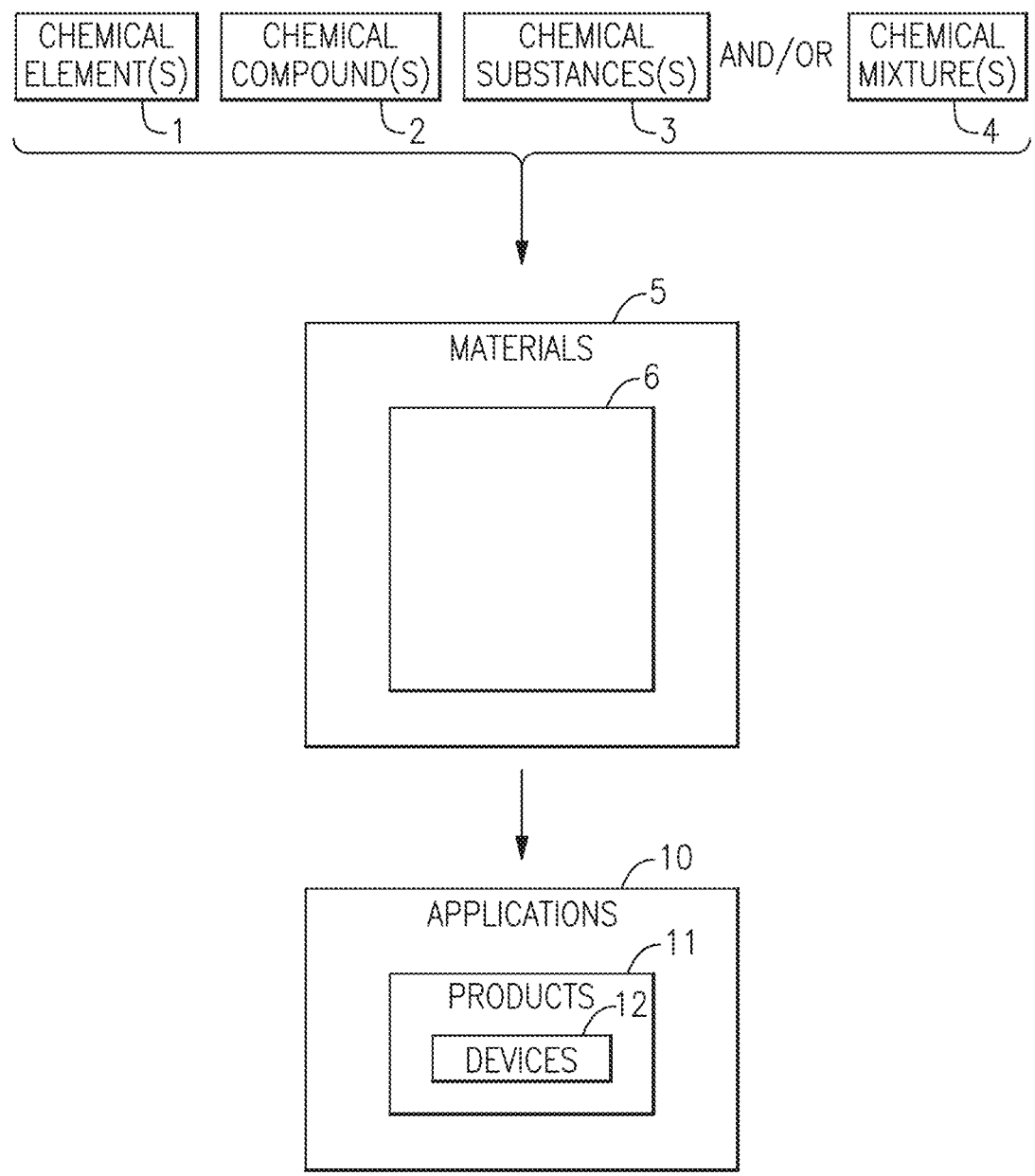
FIG. 2 schematically shows how materials having one or more features described herein can be designed, fabricated, and used.

FIG. 2 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into materials (block 6) configured to include desirable properties.

In some embodiments, a material having one or more of the foregoing properties can be implemented in applications (block 10) such as thermosensing application. Such applications can include implementations of one or more features as described herein in devices 12. In some applications, such devices can further be implemented in products 11. Examples of such devices and/or products are described herein.

Thermoelectric Sensors

Figure 3:
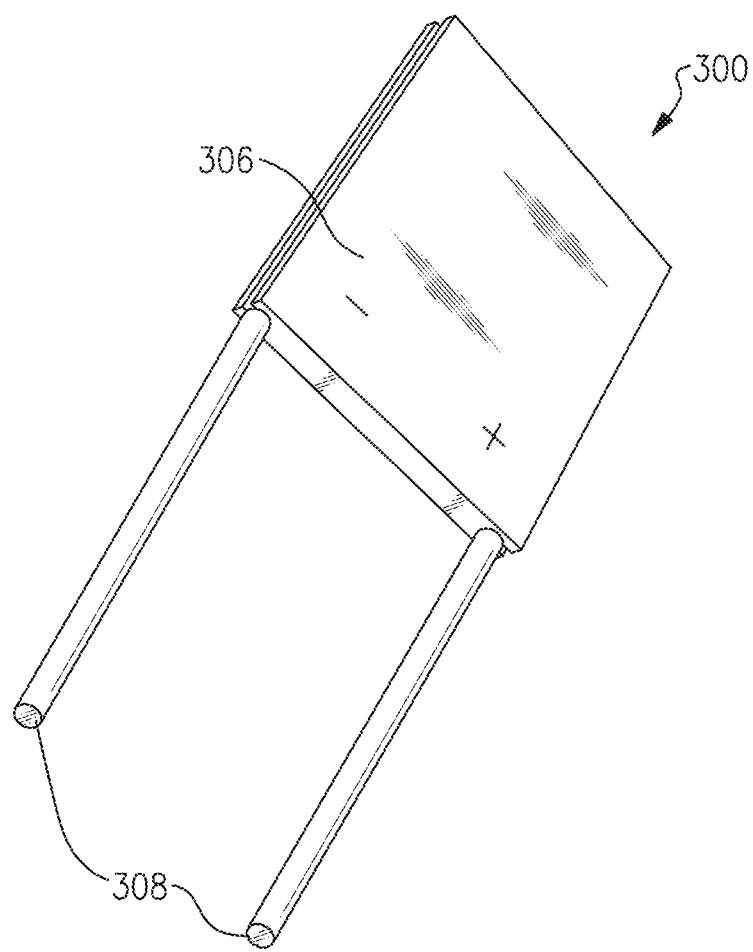
FIG. 3 illustrates an embodiment of a thermoelectric sensor.

Thermoelectric sensors 300, such as shown in FIG. 3, utilize the thermoelectric effect in order to process temperatures. The thermoelectric effect is generally a direct conversion of temperature differences to electric voltage, and vice versa. This is typically done via a thermocouple. Thus, a thermoelectric sensor creates a voltage when there is a different temperature on each side of the sensor. Atomically, a temperature gradient causes charge carriers in the material used to diffuse from the hot side to the cold side.

This effect can be used to generate electricity, measure temperature or change the temperature of objects. Because the direction of heating and cooling is determined by the polarity of the applied voltage, thermoelectric devices can be used as temperature controllers. The thermoelectric effect is a result of a number of different effects and equations, as discussed below.

The Seebeck effect is the conversion of heat directly into electricity at the junction of different types of wire. The Seebeck effect illustrates an electromotive force, where the local current density is given by the equation:

$$J=\sigma(-\nabla V+E_{emf})$$

Where V is the local voltage, and $\sigma$ is the local conductivity. The Seebeck effect can be described locally by the creation of an electromotive field:

$$E_{emf}=-S\nabla T$$

where S is the Seebeck coefficient, or thermopower, and $\nabla T$ is the temperature gradient. The Seebeck coefficients generally vary as function of temperature and depend strongly on the composition of the conductor. For ordinary materials at room temperature, the Seebeck coefficient may range in value from −100 μV/K to +1,000 μV/K In a steady state, where J=0, voltage gradient can be summarized simply by the emf: $-\nabla V=S\nabla T$. This simple relationship, which does not depend on conductivity, is used in the thermocouple to measure a temperature difference; an absolute temperature may be found by performing the voltage measurement at a known reference temperature.

When an electric current passes through a circuit of a thermocouple, heat is evolved at one junction and absorbed at a different junction, known as the Peltier Effect. This effect is the presence of heating or cooling at an electrified junction of two different conductors. When a current is made to flow through a junction between two conductors, A and B, heat may be generated or removed at the junction. The Peltier heat generated at the junction per unit time is:

$$Q=(\Pi 2-\Pi 1)I$$

where $\Pi 2$ and $\Pi 1$ are Peltier coefficients of two conductors and I is the electric current. Total heat can also be influenced by Joule heating and thermal-gradient effects.

The Peltier coefficients represent how much heat is carried per unit charge. The Peltier effect can be considered as the back-action counterpart to the Seebeck effect. For example, if a simple thermoelectric circuit is closed, then the Seebeck effect will drive a current, which in turn, by the Peltier effect, will always transfer heat from the hot to the cold junction. The close relationship between Peltier and Seebeck effects can be seen in the direct connection between their coefficients.

In some embodiments, the Seebeck coefficient is not constant in temperature, so there can be a gradient formed. If a current is driven through this gradient, then a continuous version of the Peltier effect will occur, known as the Thomson effect. It describes the heating or cooling of a current-carrying conductor with a temperature gradient. If a current density J is passed through a homogenous conductor, the Thomson effect can predict a heat production rate per unit volume:

$$Q=-KJ*\nabla T$$

Wherein $\nabla T$ is temperature gradient, and K is the Thomson coefficient.

Embodiments of the disclosed sensors can be used to, for example, generate electricity, measure the temperature of an object, or change the temperature of an object. Additionally, embodiments of the disclosed sensors can also be used as temperature controllers.

Figure 4:
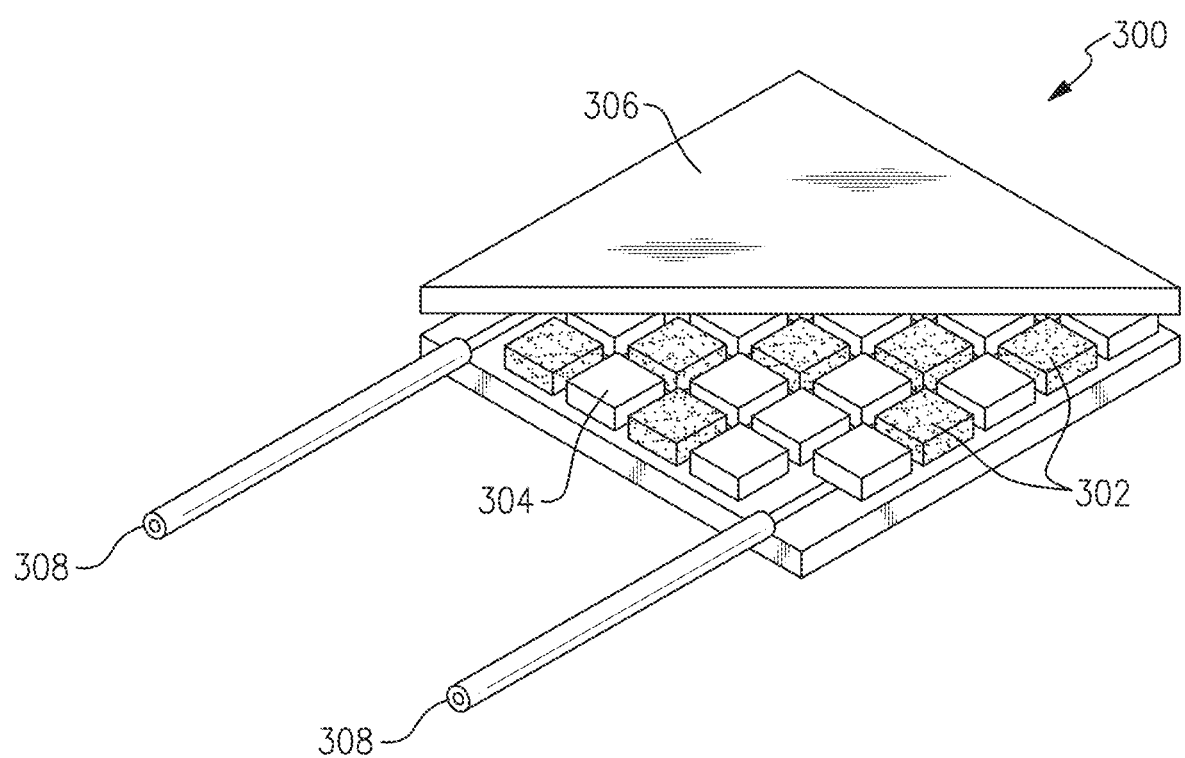
FIG. 4 illustrates internal components of a thermoelectric sensor.

FIG. 4 illustrates components within a thermoelectric sensor 300. As shown, the sensor 300 can include p-type components 302 and n-type components 304. These components can be contained in a housing 306, or may be generally openly placed on a substrate. The sensor 300 can include electrical connections 308, such as to a voltmeter. The connections 308 can be wires, tubes, rods, etc.

Figure 5:
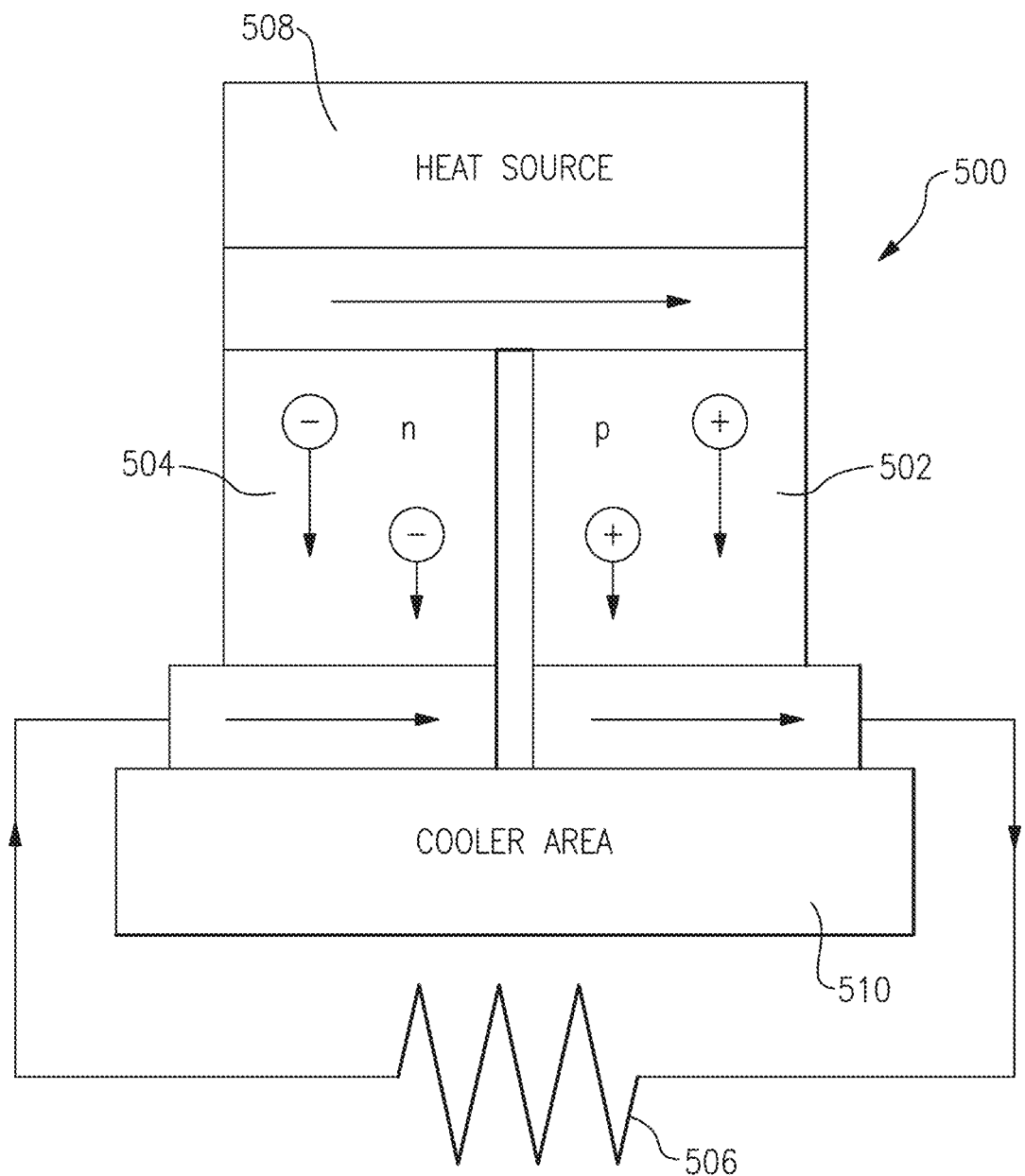
FIG. 5 illustrates an internal schematic of a thermoelectric sensor.

FIG. 5 illustrates a schematic of an operation of a thermoelectric sensor 300. As shown, a thermoelectric circuit 500 composed of materials of different Seebeck coefficients (p-doped 502 and n-doped 504 semiconductors). The circuit can include a voltmeter 506, which allows the circuit 500 to function as a temperature-sensing thermocouple to determine the temperature difference between a heat source 508 and a cooler area 510.

Materials for Thermoelectric Sensors

Disclosed herein are embodiments of materials which can be, for example, incorporated into semiconductor based thermoelectric sensor applications. Advantageously, embodiments of the disclosure can avoid the use of expensive materials, such as platinum metal, rhodium metal, or indium tin oxide. Further, embodiments of the disclosure can reduce or eliminate reactions between n-type components and p-type components. In some embodiments, the n-type components do not react with the p-type components.

In some embodiments, the same base material can be used for both the n-type component and the p-type component of the sensing system. In other embodiments, different base materials can be used. In some embodiments, $LnAlO_3$ may be used as the base material for both components (p-type and n-type) of the sensor. Ln can be La, Ce, Pr, Nd, Sm, Gd, Tb, Dy, Ho, Er, Tm, Y, Yb, Lu, or combinations thereof. In some embodiments, the $LnAlO_3$ material, doped or undoped, and may have a perovskite structure.

Figure 6:
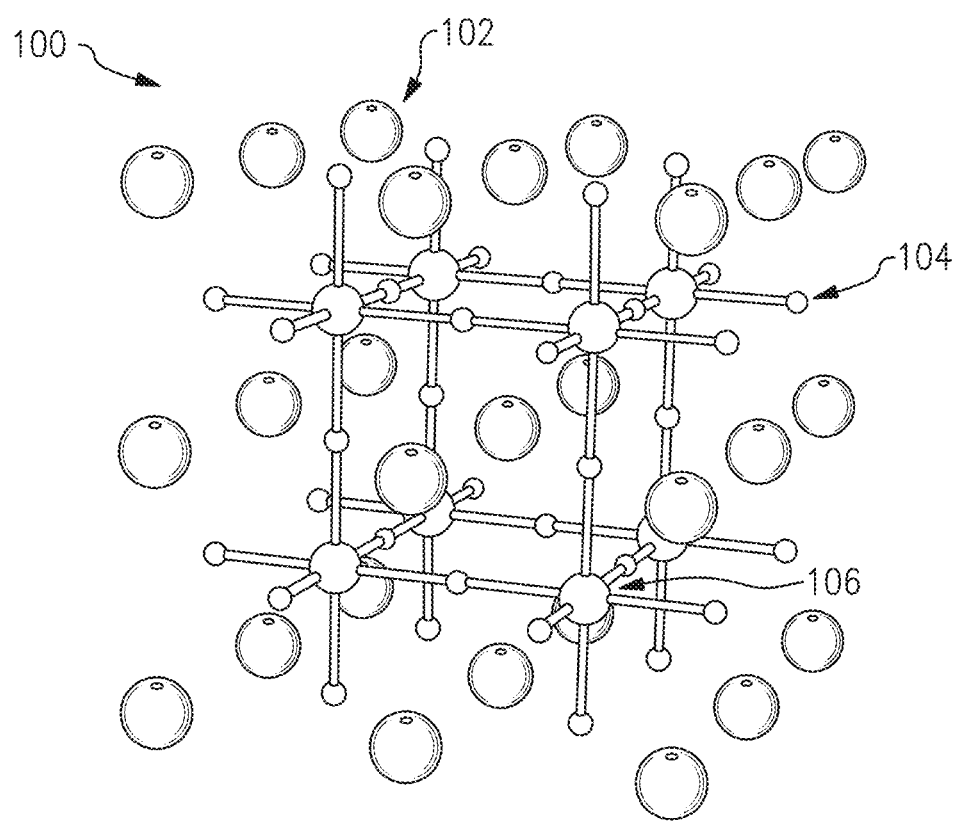
FIG. 6 illustrates the crystal structure of a perovskite with the general property $ABX_3$.

FIG. 6 illustrates an example crystal structure of a perovskite. A material has a perovskite structure if it has the same crystal structure as calcium titanium oxide ($CaTiO_3$). Typically, a perovskite structure has a general chemical composition of $ABX_3$, wherein A 102 and B 104 are both cations, though of different sizes, and X 106 is an anion that bonds to both A 102 and B 104. The A cations 102 are located in the corners, the B atoms 104 are located in a body centered position and the X anions 106 sit in the face centered positions. Typically, the A cations 102 are larger than the B cations 104. Because the perovskite structure has stringent size requirements of the cations, the crystal can become distorted, by incorrect element placement, into structures with a lower symmetry and structural weakness. If distortion does occur, the number of cations tends to be reduced within the crystal structure. A perovskite structure can also be complex, wherein the structure contains two different types of B cations 104.

With regards to the p-type components, the $LnAlO_3$ can be doped with Sr and Co, which can impart p-type conductivity to the $LaAlO_3$. Specifically, the doping can oxidize the Co, making the charge carrier predominantly holes. This can generate $Co^{3+}$ and $Co^{4+}$, as $Sr^{2+}$ doping can convert from the +3 to the +4. In some embodiments, it may also generate oxygen vacancies as denoted by z in the following equations. This can be dependent on the Sr content and the temperature and oxygen partial pressure during processing. The doped composition can have the formula $Ln_{1-x}Sr_xAl_{1-y}Co_yO_{3+/-z}$. In some embodiments, $0<x<1$. In some embodiments, $0<y<1$. In some embodiments, $z<1$.

With regards to the n-type component, the $LnAlO_3$ can be doped with Mn and Nb, which can impart n-type conductivity to the $LaAlO_3$, to form a composition having the formula $LnAl_{1-x-y}Mn_yNb_xO_{3+/-z}$. In some embodiments, $0<y<1$. In some embodiments, $0<x<0.2$. In some embodiments, $z<1$. In some embodiments, the doping may also generate oxygen vacancies as denoted by z in the following equations. This can be dependent on the Nb content and the temperature and oxygen partial pressure during processing. The doping reduces the Mn, making the majority charge carriers be predominantly electrons.

In some embodiments, the material (or sensor, or sensor components) may not include platinum or rhodium. In some embodiments, the material may not include indium tin oxide.

For each of the above doped materials, larger y values indicate a material with larger thermopower (e.g., a measure of the voltage differential between the n and p legs) but lower stability with regard to the reaction between the n and p legs. Alternatively, smaller values of y indicate greater stability but a lower thermopower. The higher thermopower can allow for better resolution in the electrical signal, resulting in more accurate temperature measurements.

Method of Applying

Figure 7:
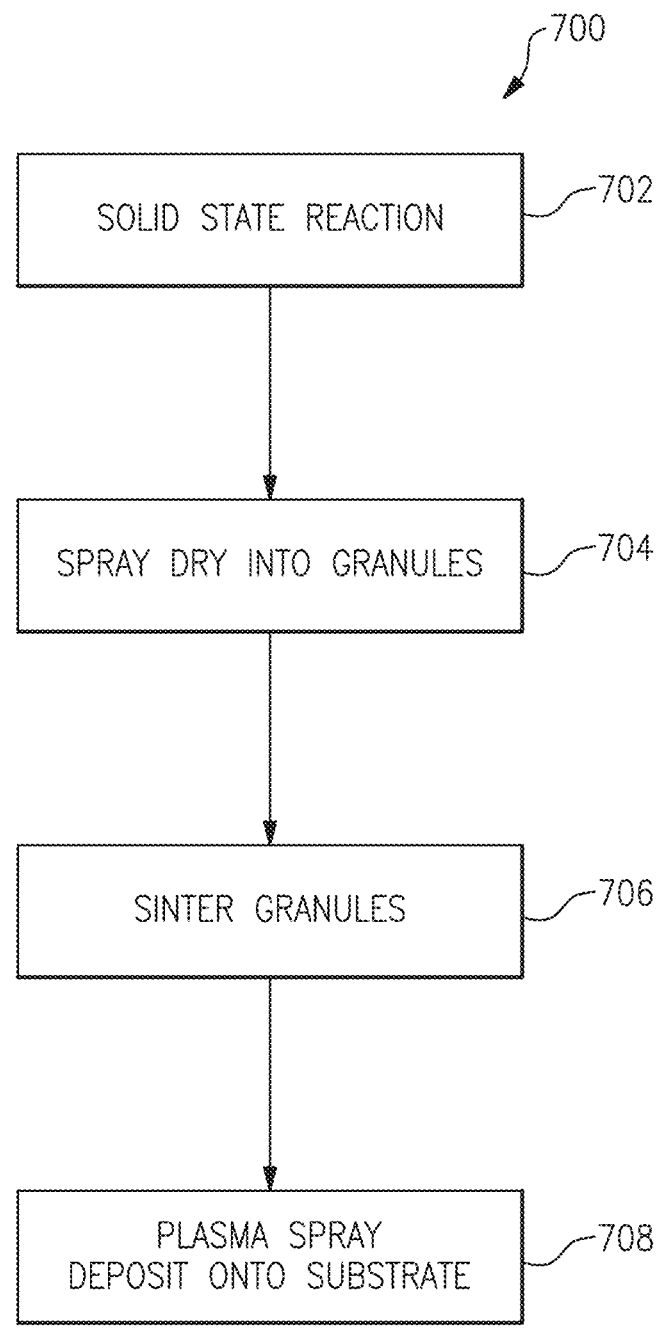
FIG. 7 illustrates an example embodiment of a method of applying a high-temperature oxide material.

FIG. 7 illustrates a method 700 of forming the materials and sensors disclosure herein. As shown, first the initial materials can be formed by a solid state reaction 702. Any doping can occur when the oxide materials are weight out and heat treated to form the crystalline phase. Following this reaction, the materials can be spray dried into granules 704, which can then be sintered into hard agglomerates 706. This agglomerates can be plasma sprayed and deposited onto a substrate to form a solid coating upon cooling 708. The deposited material can then be incorporated into electronics to form a sensor. For example, a voltmeter can be attached between n and p type deposited layers. In some embodiments, successively deposited layers can serve as the sensor. However, this is merely one example of applying and forming a sensor, and other methods can be used as well. The disclosure is not limited by any particular methodology.

Plasma Spraying

Figure 8:
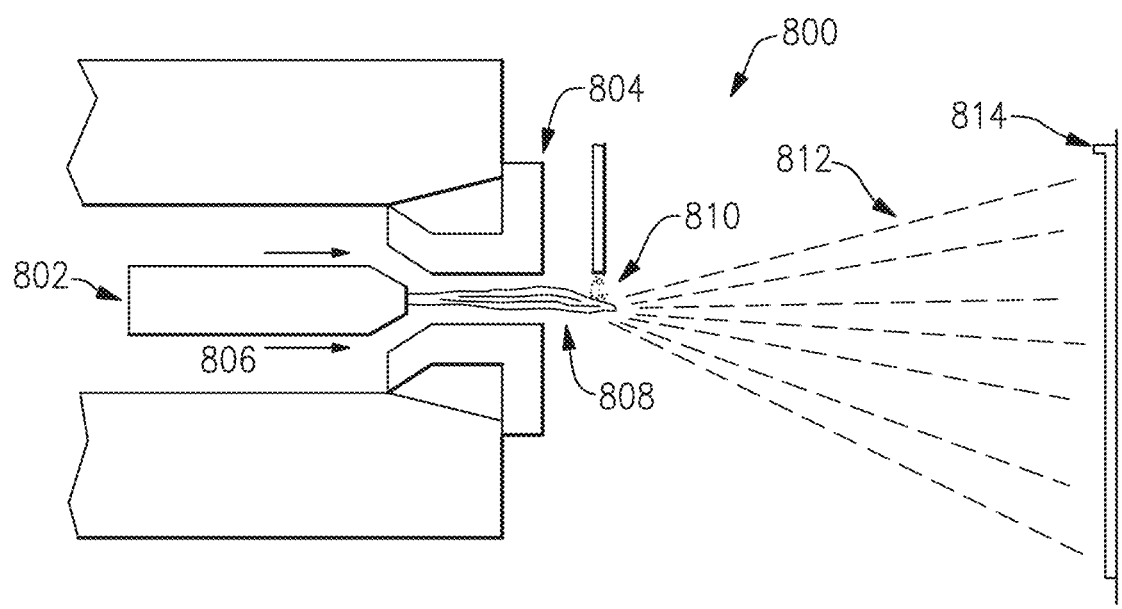
FIG. 8 illustrates a plasma sprayer depositing a material on a surface.
Figure 9:
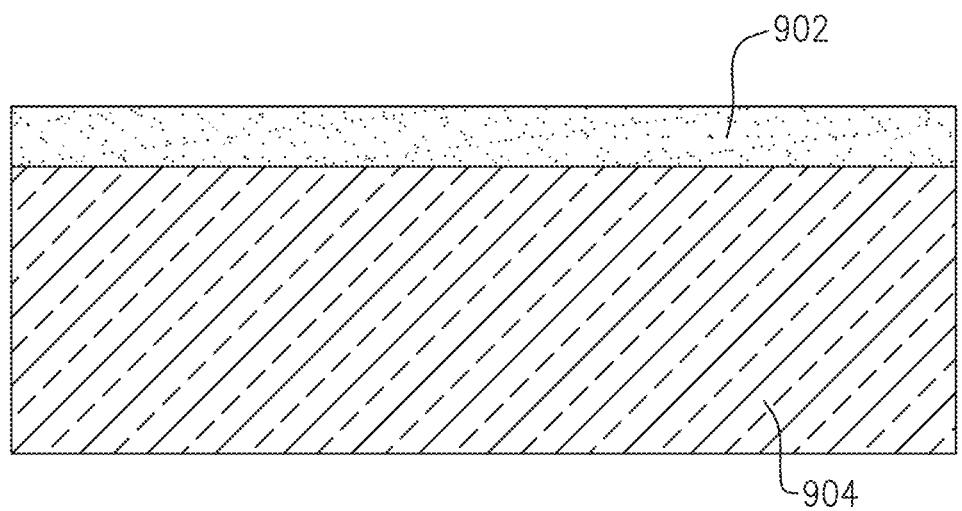
FIG. 9 illustrates an embodiment of a coated substrate.
Figure 10:
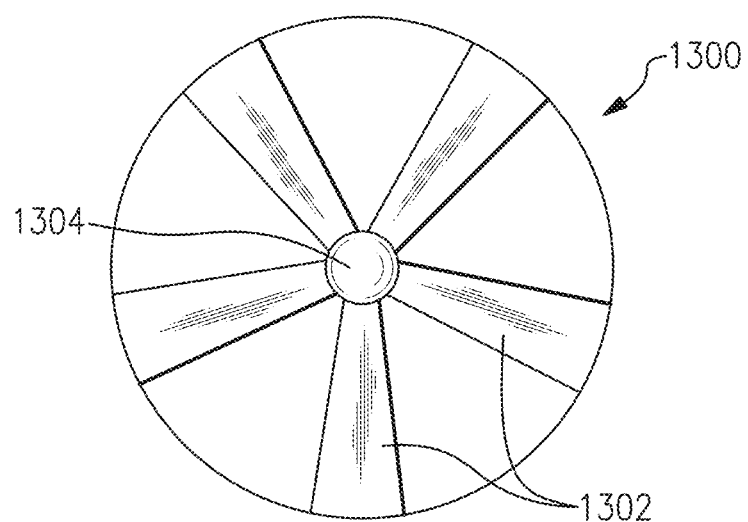
FIG. 10 illustrates a turbine, for example within a jet engine.

The materials disclosure herein can be plasma sprayed. However, plasma spraying is a non-limiting example of how the material can be manufactured. FIG. 8 illustrates an example of plasma spraying, which is a type of thermal spraying. At the most basic level, plasma spraying 800 involves spraying of molten or heat softened material onto another surface to provide a coating. A plasma sprayer uses a combination of a cathode 802 and an anode 804. Respectively, a cathode 802 and an anode 804 can be made of, but are not limited to, tungsten and copper. During plasma spraying, the cathode 802 and anode 804 need to be cooled. This can be done by, but is not limited to, water cooling. Gas 806 capable of plasma formation flows around the cathode 802 and through the anode 804. Different gasses can be used to form different heat conditions. For example, gas can be argon, nitrogen, hydrogen, or helium. Typically, the anode 804 is shaped with a small diameter opening to allow the gas 806 to be sprayed out with a high velocity. While the gas 806 is moving around the cathode 802, a high voltage is discharged, causing localized ionization and a conductive path for a DC arc to form between the cathode 802 and anode 804. The large amount of heat produced causes the gas 806 to reach an extremely high temperature and strips the gas molecules of their electrons, thus forming a plasma. The newly formed plasma exits the front of the anode. Because no combustion is actually used, low oxide coatings can be produced. The gas atoms then recombine from their plasma state, thus producing extremely high temperatures 808. Temperatures range from about 8,000° C. to about 15000° C. Powder 810 is injected into the escaping gas 806, at the exit of the anode 804. The dual function coating composition is not limited to a powder. The powder is then heated by the gas 806 and propelled 812 towards the desired surface 814, forming a coating. Upon reaching the desired surface 814, the molten drops of material flatten and solidify. The gas flow, voltage, and nozzle can all be accurately controlled, thus providing a reliable, repeatable, and consistent spray. FIG. 9 illustrates the final result of plasma spraying, with a sprayed coating 902 covering a substrate 904.

Sensor Applications

The sensors and compositions made in accordance with some embodiments in this disclosure can be utilized on various devices that are subject to high temperature conditions. These devices include, but are not limited to, aircraft components, automobile components, and spacecraft components.

FIG. 13 illustrates a turbine 1300 incorporating the thermoelectric compositions discussed herein. The turbine 1300 can include one or more turbine blades 1302 that rotate around a central axis 1304. The turbine is put into contact with hot gases that leave the combustions chamber of the direct engine.

The turbines discussed herein can be utilized in, as an example, jet engines. Jet engines operate at very high temperatures, wherein these temperatures are usually well above the melting point of the materials that make up the engine. Jet engines, generally, refer to the engines used on, for example, aircrafts, missiles, and unmanned aerial vehicles. Jet engines can be created in numerous specifications, such as air breathing and turbine powered jet engines, but all use forward thrust from jet propulsion to drive the vehicle. High temperatures are necessary to achieve greater power and fuel efficiency with the jet engine. Therefore, the ability to accurately sense temperatures at these high temperatures can be advantageous.

The turbines discussed herein can be used in other systems as well. For example, the turbine blades can be utilized in industrial gas turbines to measure the temperature in situ.

From the foregoing description, it will be appreciated that inventive thermoelectric sensors and methods of manufacture are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A thermoelectric system comprising:
a p-type material formed from $LnAlO_3$ doped with strontium and cobalt and having a perovskite structure with a general chemical composition of $ABX_3$, A and B being cations $Ln_{1-x}Sr_x$ and $Al_{1-y}Co_y$, X being an anion $O_{3+/-z}$ that bonds to both A and B, the A cations located in corners of the perovskite structure, the B cations located in a body centered position, and the X anions sitting in face centered positions, the p-type material being $Ln_{1-x}Sr_xAl_{1-y}Co_yO_{3+/-z}$, x being between 0 and 1, y being between 0 and 1, and z<1; and
an n-type material formed from $LnAlO_3$ doped with manganese and niobium and having a perovskite structure with a general chemical composition of $ABX_3$, A and B being cations Ln and $Al_{1-x-y}Mn_yNb_x$, X being an anion $O_{3+/-z}$ that bonds to both A and B, the A cations located in corners of the perovskite structure, the B cations located in a body centered position, and the X anions sitting in face centered positions, the n-type material being $LnAl_{1-x-y}Mn_yNb_xO_{3+/-z}$, x being between 0 and 0.2, y being between 0 and 1, and z<1.

2. The thermoelectric system of claim 1 wherein the system does not contain platinum.

3. The thermoelectric system of claim 1 wherein the system does not contain indium tin oxide.

4. The thermoelectric system of claim 1 wherein the n-type material and p-type material are unreactive at temperatures of 400-1200° C.

5. The thermoelectric system of claim 1 wherein Ln is selected from the group consisting of La, Ce, Pr, Nd, Sm, Gd, Tb, Dy, Ho, Er, Tm, Y, Yb, and Lu.

6. The thermoelectric system of claim 1 wherein the thermoelectric system is configured to generate electricity.

7. The thermoelectric system of claim 1 wherein the thermoelectric system is configured to measure temperature.

8. The thermoelectric system of claim 1 wherein the thermoelectric system is configured to change a temperature of an object.

9. The thermoelectric system of claim 1 further comprising a plurality of p-type components including the p-type material and a plurality of n-type components including the n-type material.

10. The thermoelectric system of claim 9 further comprising a substrate supporting the p-type material and the n-type material.

11. The thermoelectric system of claim 10 wherein the plurality of p-type components and the plurality of n-type components are arranged in a grid on the substrate.

12. The thermoelectric system of claim 10 further comprising a plurality of electrical connections extending from the substrate.

13. The thermoelectric system of claim 12 wherein the plurality of electrical connections include wires, tubes, or rods.

14. The thermoelectric system of claim 1 further comprising a housing containing the p-type material and the n-type material.

15. The thermoelectric system of claim 14 further comprising a plurality of electrical connections including wires, tubes, or rods.

16. A thermoelectric sensor comprising:
a p-type material formed from $LnAlO_3$ doped with strontium and cobalt and having a perovskite structure with a general chemical composition of $ABX_3$, A and B being cations $Ln_{1-x}Sr_x$ and $Al_{1-y}Co_y$, X being an anion $O_{3+/-z}$ that bonds to both A and B, the A cations located in corners of the perovskite structure, the B cations located in a body centered position, and the X anions sitting in face centered positions, the p-type material being $Ln_{1-x}Sr_xAl_{1-y}Co_yO_{3+/-z}$, x being between 0 and 1, y being between 0 and 1, and z<1; and
an n-type material formed from $LnAlO_3$ doped with manganese and niobium and having a perovskite structure with a general chemical composition of $ABX_3$, A and B being cations Ln and $Al_{1-x-y}Mn_yNb_x$, X being an anion $O_{3+/-z}$ that bonds to both A and B, the A cations located in corners of the perovskite structure, the B cations located in a body centered position, and the X anions sitting in face centered positions, the n-type material being $LnAl_{1-x-y}Mn_yNb_xO_{3+/-z}$, x being between 0 and 0.2, y being between 0 and 1, and z<1.

17. A thermoelectric electricity generator comprising:
a p-type material formed from $LnAlO_3$ doped with strontium and cobalt and having a perovskite structure with a general chemical composition of $ABX_3$, A and B being cations $Ln_{1-x}Sr_x$ and $Al_{1-y}Co_y$, X being an anion $O_{3+/-z}$ that bonds to both A and B, the A cations located in corners of the perovskite structure, the B cations located in a body centered position, and the X anions sitting in face centered positions, the p-type material being $Ln_{1-x}Sr_xAl_{1-y}Co_yO_{3+/-z}$, x being between 0 and 1, y being between 0 and 1, and z<1; and
an n-type material formed from $LnAlO_3$ doped with manganese and niobium and having a perovskite structure with a general chemical composition of $ABX_3$, A and B being cations Ln and $Al_{1-x-y}Mn_yNb_x$, X being an anion $O_{3+/-z}$ that bonds to both A and B, the A cations located in corners of the perovskite structure, the B cations located in a body centered position, and the X anions sitting in face centered positions, the n-type material being $LnAl_{1-x-y}Mn_yNb_xO_{3+/-z}$, x being between 0 and 0.2, y being between 0 and 1, and z<1.

* * * * *